M. RUBIN,
Assignor to SCHEUER & BROTHER.
Fan.
No. 9,636. Reissued April 5, 1881.
Fig: 1.
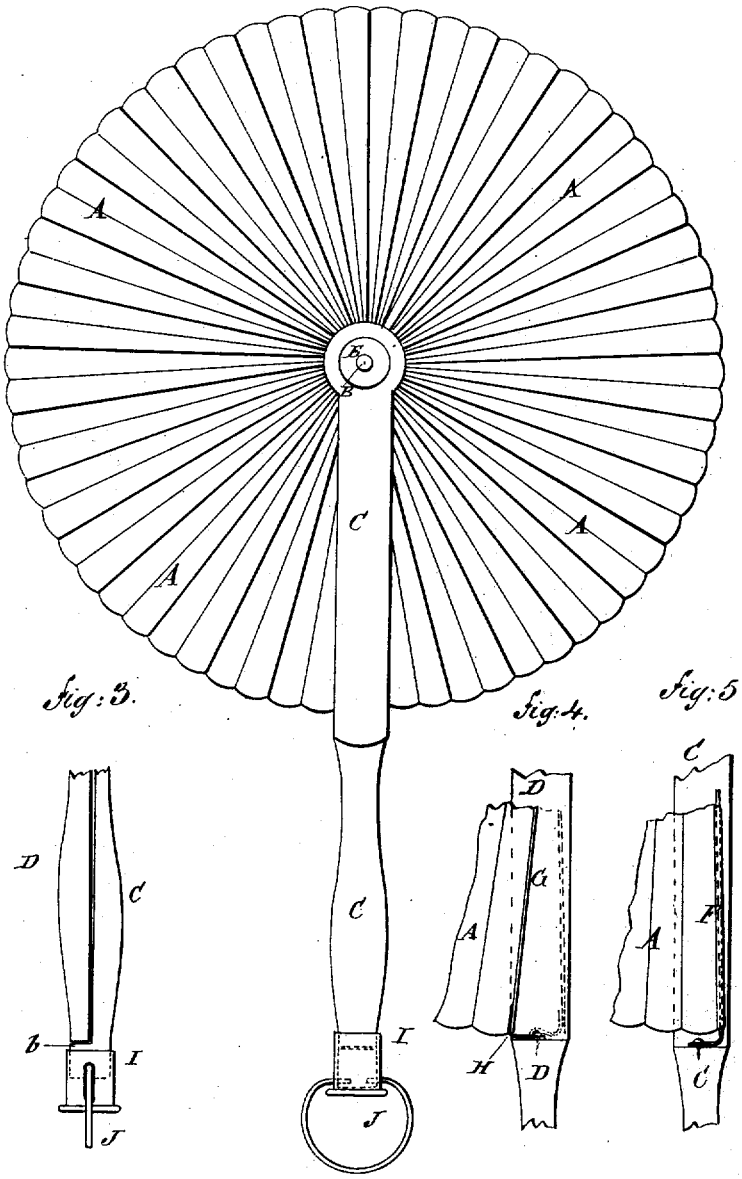
Fig: 2.
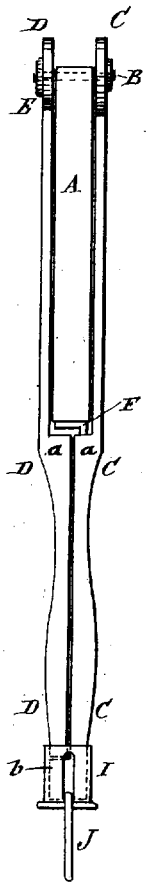
Fig: 3.
Fig: 4.
Fig: 5
WITNESSES:
Carl Kaup
Otto Risch
INVENTOR
Max Rubin
BY Paul Goepel
ATTORNEY
M. PETERS, PHOTO-LITHOGRAPHER, WASHINGTON, D. C.

UNITED STATES PATENT OFFICE.

MAX RUBIN, OF NEW YORK, N. Y., ASSIGNOR TO SCHEUER & BROTHER, OF SAME PLACE.

FAN.

SPECIFICATION forming part of Reissued Letters Patent No. 9,636, dated April 5, 1881.

Original No. 234,813, dated November 23, 1880. Application for reissue filed January 13, 1881.

*To all whom it may concern:*

Be it known that I, MAX RUBIN, of the city, county, and State of New York, have invented a new and useful Improvement in Fans, of which the following is a specification.

In the accompanying drawings, Figure 1 represents a side elevation of my improved fan, shown in open position. Fig. 2 is an end view of the same in closed position. Fig. 3 is an end view of the lower part of the handles, shown with cap or socket drawn back so as to clear the lower end of one handle-section; and Figs. 4 and 5 show the connection of the end strips of the web with the handle-sections.

Similar letters of reference indicate corresponding parts.

This invention relates to that class of fans in which the web folds between two handles and opens into circular form by swinging one handle-section on the connecting end pivot of the handle-sections through an entire circle, and returning in a similar manner the swinging handle-section, so as to make the fan more convenient in use and facilitate the handling of the same.

The invention consists of two longitudinally divided or split handle-sections, which are connected to each other at one end and to the center of the web by a pivot, while the opposite or lower end of the handle-sections are locked together by a tubular cap or other fastening device, which is connected to one handle-section and adapted to be applied to or released from the other handle-section. The web is attached, by end strips, to inwardly-projecting shoulders of the handle-sections, one end strip being adapted to swing from one side of the handle-section to the other in opening or closing the fan.

In the drawings, A represents the web of the fan, which is folded, in the usual manner, between two longitudinally divided or split handle-sections, C D, that are connected to each other at their upper ends and to the web by a pivot, B, and washers E.

The outer folds of the web A are provided with metal strips F G, the inner ends of which are connected with the pivot B by the fastenings that connect the ends of the folds with said pivot B. The outer ends of the strips F and G are secured to inwardly-projecting shoulders *a a* of the handle-sections C and D, one end strip being connected to the shoulder of one handle-section and the other to the shoulder of the other handle-section. One of the end strips may be rigidly attached to the shoulder, while the other is attached in such a manner as to readily swing from one side of the handle to the other in opening or closing the web of the fan. For this purpose the connection may be made by a short ribbon, H, which is attached to the end strip, G, and the shoulder *a* of the handle-section D, as shown clearly in Fig. 4.

In place of the ribbon H, any other connecting device may be used by which the end strip is enabled to swing from one side of the handle-section to the other in following the web in opening or closing the same. The web of the fan folds into the space formed between the upper portions of the handle-sections, above the inwardly-projecting shoulders *a a*, the upper portions being made flat and parallel to each other, while the lower parts of the handle-sections below the shoulders are preferably of semicircular cross-section, so as to form, when face to face to each other, a round handle for the fan.

The handle-sections C and D are connected at their lower ends by means of a tubular cap, I, which is attached to the end of the longer handle-section C, the cap being slotted longitudinally and guided along a ring, J, which is attached to the longer section, the ring preventing the cap from being drawn off the end of the handle-section, and also admitting the sliding of the same thereon. The shorter handle-section is locked by means of the tubular cap to the longer handle-section, which has a shoulder, *b*, near its outer end, and readily released therefrom by drawing the cap back. When released, it may be swung on the pivot at its opposite end parallel to the other handle-section through an entire circle, so as to open thereby the web of the fan until the handles overlap each other again, when the cap is pushed over the shorter handle-section, so as to lock the same to the longer handle-section. In closing the fan the same operation is performed, but in a reverse direction.

In place of the sliding tubular cap, any other fastening device of the ends of the handle-sections may be used, as it is obvious that a number of different mechanical devices may be substituted therefor.

Having thus described my invention, I claim as new and desire to secure by Letters Patent—

1. In a folding fan, the combination, with the web A, of longitudinally-split handle-sections C D, which are pivoted to each other and to the center of the web at one end, and connected at the opposite end by a fastening device, substantially as set forth.

2. In a fan, the combination of longitudinally-split handle-sections C D, having inwardly-projecting shoulders *a a*, with a folding web, A, having transverse end strips, F and G, which are respectively connected to the handle-sections, substantially as specified.

3. In a fan, a folding web and longitudinally-split handle-sections, the upper parts of which are flat and parallel, while the lower parts overlap each other, in combination with a connecting-pivot at one end, and with a releasing and fastening device at the opposite end of the handles, substantially as shown and described.

4. In a fan, the combination, with the web A, having transverse end strips, F G, of longitudinally split and pivoted handles C D, having inwardly-projecting shoulders *a a*, to which the end strips are connected, one end strip being adapted to swing from one side of the handle-section to the other, substantially as and for the purpose set forth.

5. In a folding fan, the combination, with the web A and pivot B, of the handles C D, the longer one having a shoulder, *b*, near the outer end, against which the other folds, as shown and described.

6. In a fan, the metallic strips F G, attached to the outer fold of web A, and connected at the end with the pivot B, in combination with the handles C D, having shoulders to which the ends of said strips are connected, the strip F directly and the strip G by a ribbon, H, as and for the purpose specified.

7. The combination, with handles C D, one of which is shorter than the other, and fits against a shoulder, *b*, thereof, of the tubular cap I, held by a slot and ring to the end of longer handle, but so that it can be drawn off the end of the shorter one, as shown and described.

In testimony that I claim the foregoing as my invention I have signed my name, in presence of two witnesses, this 17th day of December, 1880.

M. RUBIN.

Witnesses:
PAUL GOEPEL,
CARL KARP.